Patented Apr. 6, 1954

2,674,516

UNITED STATES PATENT OFFICE 2,674,516

ANTIFUME COMPOSITIONS

Victor R. Hurka, Wilmington, Del., assignor to E. I. du Pont de Nemours and Company, Wilmington, Del., a corporation of Delaware No Drawing. Application December 5, 1951, Serial No. 260,120

3 Claims. (Cl. 8—61)

This invention relates to anti-fume compositions, and more particularly to such compositions which contain N,N'-diphenyl-1,2-propanediamine as the active ingredient.

Many dyes which are used in the coloring of cellulose acetate are subject to fading and discoloration when exposed to combustion gases and particularly to the oxides of nitrogen. To inhibit this fading or discoloration, a number of anti-fume preparations are now available on the market. N,N'-diphenyl-1,2-propanediamine and N,N'-diphenylethylenediamine are frequently used as the active ingredients in such preparations. Although the various compositions are generally effective in preventing fume-fading of the dyes with which they are used, many of them are disadvantageous in some other respect. Some of these formulations are dangerous to handle because they contain large amounts of organic solvents having low flash points. Some are expensive, while others tend to separate into layers when stored in cold warehouses. Some of the dispersible types which are easily dispersed in water at room temperature are very difficult to incorporate into hot dye-baths to give the high degree of uniformity required in such emulsions to prevent specking on the fabric.

It is an object of this invention to provide stable compositions which are effective in preventing the fume-fading or discoloration of dyes used on cellulose acetate. A further object is to provide relatively cheap, clear solutions of N,N'-diphenyl-1,2-propanediamine which are readily dispersible in warm dye-baths and which are stable during storage at low temperatures. Further objects will appear from the detailed description of this invention which follows.

These objects are accomplished by the anti-fume compositions of this invention which consist of from 28 to 38% by weight of N,N'-diphenyl-1,2-propanediamine, from 9 to 25% by weight of an oil-soluble, water-dispersible sodium petroleum sulfonate, from 5 to 11% by weight of triethanolamine, from 35 to 50% by weight of a water-immiscible organic solvent mixture having an aniline point of less than 50° C. and containing a mineral oil and a cyclic hydrocarbon solvent from the class consisting of aromatic, naphthenic and terpene hydrocarbons, and from 0 to 2% by weight of water.

A preferred composition according to this invention consists of from 31 to 35% by weight of N,N'-diphenyl-1,2-propanediamine, from 14.0 to 16.0% by weight of an oil-soluble, water-dispersible sodium petroleum sulfonate, from 7.0 to 9.5% by weight of triethanolamine, from 12.5 to 15.0% by weight of mineral oil, from 25 to 29% by weight of a high-flash aromatic coal-tar solvent, the aniline point of the mixture of mineral oil and aromatic solvent being less than 50° C., and from 0 to 2.0% by weight of water.

These compositions are prepared by simply mixing the ingredients until a clear solution is obtained. This may be done at room temperature but is preferably performed at a temperature of 50 to 70° C. in order to decrease the viscosity of the sodium petroleum sulfonate mixture and consequently the time required to obtain complete solution. The compositions are clear, dark brown, homogeneous liquids which are readily dispersible in water to form stable emulsions.

When amounts of N,N'-diphenyl-1,2-propanediamine below 28% are used, the composition is emulsifiable but is somewhat deficient in anti-fume properties. When more than 38% of the diamine is used, the formulations have inferior dispersibility and high cloud points and are unnecessarily expensive.

The sodium petroleum sulfonate may be added in the form of any one of the commercially available surface-active agents of this type which are soluble in oil and dispersible in water. In general these sulfonates are mixtures having an average molecular weight of about 450 to 550. They are soluble in water to the extent of only 1 to 2%, but are water-dispersible in high concentration. They possess the unique ability to form stable aqueous emulsions of N,N'-diphenyl-1,2-propanediamine in the temperature range of 60 to 100° C. When the anti-fume composition contains less than 9% of the sodium petroleum sulfonate, it does not disperse satisfactorily and has an increased cloud point. If amounts greater than 25% are used, the viscosity of the composition is undesirably high and there may be an increase in the cloud point as a result of the increased amounts of mineral oil, which is usually introduced into the composition with the sodium petroleum sulfonate.

Commercially available sodium petroleum sulfonate compositions ordinarily contain sizable amounts of mineral oil, usually comprising 30 to 50% of the composition, small amounts of water, from 0 to about 5%. The water which may appear in the final anti-fume composition is derived from this source, no separate addition of water ordinarily being made.

The organic solvent mixture which is present in the anti-fume composition contains mineral oil, all of which is ordinarily derived from the sodium petroleum sulfonate composition, and a cyclic hydrocarbon solvent from the class consisting of aromatic, naphthenic and terpene hydrocarbons. The aniline point of the solvent mixture should be below about 50° C. in order to insure satisfactory dispersibility and to prevent separation of the solution upon standing at temperatures in the range of 0 to 15° C. such as might be encountered in warehouse storage. A preferred organic solvent mixture is one consisting of from 60 to 70% by weight of a high-flash aromatic hydrocarbon solvent and from 30 to 40% by weight of mineral oil. Other suitable cyclic hydrocarbon solvents for mixing with the mineral oil include xylene, ethylbenzene, tetrahydronaphthalene, solvent naphtha and various monocyclic terpenes. This solvent preferably has a relatively high flash point so that the flash point of the resulting anti-fume composition will be in a safe range for practical use.

When less than about 35% of the organic solvent mixture is present in the composition, inferior dispersibility results. This is presumably caused by there being insufficient solvent to keep the anti-fume agent dissolved until the instant when it becomes completely dispersed in the aqueous bath.

Any commercially available grade of triethanolamine is suitable for use in the anti-fume composition. The commercial products ordinarily contain at least 80% triethanolamine together with small amounts of mono- and diethanolamine. When the anti-fume formulation contains less than 5% of triethanolamine, the composition is not stable to storage at low temperatures and its dispersion in ordinary dye-baths is accompanied by a separation of oil which may cause specking on the cellulose acetate. Compositions containing more than 11% of triethanolamine exhibit decreased stability to low temperature storage and form less stable emulsions in hot water.

Since widely different techniques are employed in the various dye houses, an anti-fume composition must operate satisfactorily under widely varying conditions if it is to be generally practical. In some cases dilute aqueous emulsions are prepared by pouring the anti-fume composition into the dye-bath and sometimes by pouring relatively large amounts of water into the anti-fume composition. An alternative procedure is to form a concentrated aqueous emulsion by mixing water and the anti-fume composition and subsequently to form dilute emulsions by pouring the concentrated emulsion into the hot dye-bath. Generally serviceable anti-fume compositions, such as those of the present invention, must produce stable emulsions by any of these procedures. The ability of anti-fume compositions to produce stable emulsions may therefore be determined by tests simulating these procedures. In one such test, 5 cc. of anti-fume composition is poured into 200 cc. of water at 60° C. with a minimum of agitation. Another test is to pour 200 cc. of water at 60° C. into 5 cc. of the anti-fume solution. A third test is to pour 100 cc. of water at either 25 or 50° C. rapidly into 15 cc. of the anti-fume composition. The stability and uniformity of the resulting emulsions are observed visually. Anomalous results may be obtained if addition of the water to the anti-fume solution, or vice versa, is very slow or if efficient agitation is employed. Under such conditions, good emulsions are obtained in some cases with compositions which fail to produce satisfactory emulsions under the more strenuous conditions of actual practice or of the tests described above.

The following examples illustrate the manner in which the compositions of this invention are prepared and used and the effect of varying the nature and amounts of their components.

Example 1

Three solutions are prepared by mixing the indicated ingredients and stirring until thoroughly blended to form clear, homogeneous solutions.

|  | Solution | | |
|---|---|---|---|
|  | 1 | 2 | 3 |
| Ingredient A | 32.3 | 31.5 | 31.2 |
| Ingredient B | 27.7 | 27.0 | 26.8 |
| Ingredient C | 30.8 | 32.5 | 33.1 |
| Ingredient D | 9.2 | 9.0 | 8.9 |

Ingredient A is a solution consisting of 48% of an oil-soluble, water-dispersible sodium petroleum sulfonate, 46% of mineral oil and 6% of water.

Ingredient B is an aromatic solvent having a boiling range of 155–255° C., flash point of over 115° F., a Kauri-butanol value of 97 (I. P. toluol=100) and an aniline point of −26° C.

Ingredient C is N,N'-diphenyl-1,2-propanediamine.

Ingredient D is technical triethanolamine containing 90% triethanolamine.

These solutions are compared with an aqueous dispersion containing 31.4% N,N'-diphenylethylenediamine as retarders of fume-fading of dyed cellulose acetate fabric. In each test there is added to the dye-bath an amount of each solution or aqueous dispersion equal to 2% of the weight of cellulose acetate fabric to be dyed. Dyeings are carried out for two hours at 180–190° F. using two different dyes, (1) the blue dye of Prototype No. 228 and (2) a mixture of this blue dye with the orange dye of Prototype No. 43, the scarlet dye of Prototype No. 244 and the red azo dye of Prototype No. 238. The dyed, inhibitor-treated fabrics and dyed untreated controls are examined for resistance to fume-fading by the test described on page 91 of the 1951 Technical Manual and Year Book of the American Association of Textile Chemists and Colorists. As judged by these tests the dispersion containing 31.4% N,N'-diphenylethylenediamine, serving as the standard, is very effective in preventing fading of the dye. Solution No. 3 is equivalent or slightly better than the standard in each case. Solution No. 2 is slightly poorer than the standard and solution No. 1 is noticeably poorer than the standard, but still gives a high degree of protection against fume-fading. All three solutions form excellent, stable emulsions when mixed into the dye-bath.

Example 2

A solution is prepared like solution No. 1 of Example 1 except that N,N'-diphenylethylenediamine is substituted for N,N'-diphenyl-1,2-propanediamine. The ingredients are blended at 70–75° C. When the resulting solution is cooled to room temperature, it deposits large amounts of crystals and cannot be used in the same way as a homogeneous, liquid anti-fume solution.

Example 3

A series of anti-fume solutions containing various cyclic hydrocarbon solvents is prepared consisting of 40 parts of organic solvent mixture of which one-third is mineral oil and two-thirds is the cyclic solvent, 33 parts of N,N'-diphenyl-1,2-propanediamine, 16 parts of a water-dispersible, oil-soluble sodium petroleum sulfonate, 9 parts of technical triethanolamine and 2 parts of water. The nature of the cyclic solvent and the quality of the resulting anti-fume solutions are shown in the following table. In estimating the quality of the solutions, account is taken of the emulsion stability at the normal dye-bath temperature of about 60° C., and of the resistance to separation on low temperature storage, at about 10° C.

| Cyclic solvent | Aniline point of solvent mixture (mineral oil + cyclic), °C | Quality of solution |
|---|---|---|
| Xylene | 22 | excellent. |
| High-flash aromatic solvent | 36 | Do. |
| Alpha-pinene | 59 | poor. |
| Mixture of monocyclic terpenes | 38 | good. |
| Cyclohexane | 61 | poor. |
| Tetrahydronaphthalene | 27 | excellent. |
| Solvent naphtha | 22 | Do. |

*Example 4*

Compositions are prepared containing 34% N,N'-diphenyl-1,2-propanediamine, 9% technical triethanolamine, 14.7% sodium petroleum sulfonate, 2% water and the amounts of solvents shown in the following table:

| Mineral oil | 14.3 | 16.9 | 19.5 | 22.1 | 24.7 | 14.3 | 15.6 | 16.9 |
|---|---|---|---|---|---|---|---|---|
| Xylene | 26 | 23.4 | 20.8 | 18.2 | 15.6 | | | |
| High-flash coal-tar aromatic solvent of Example 1 | | | | | | 26 | 24.7 | 23.4 |
| Aniline point of solvent mixture, °C | 27 | 35 | 46 | 51 | 57 | 39 | 45 | 56 |
| Clarity of solution at 10°C | OK | OK | OK | Bad | Bad | OK | OK | Bad |

At lower concentrations of N,N'-diphenyl-1,2-propanediamine and higher concentrations of sodium petroleum sulfonate, a slightly higher aniline point can be tolerated in the mixed solvents but in no case are satisfactory results obtained using a solvent mixture with an aniline point higher than 55° C. At low sodium petroleum sulfonate concentrations and high solvent concentrations, the preferred compositions contain organic solvent mixtures having relative low aniline points.

*Example 5*

A series of compositions is prepared in which various emulsifying agents are used in place of sodium petroleum sulfonate in mixtures otherwise approximating the compositions described in Example 1. The agents tried include a variety of non-ionic and anionic surface active agents such as a polyethylene ether of a long chain fatty acid, sorbitan monolaurate, sorbitan monostearate, a sorbitan monolaurate polyoxyethylene derivative, a sorbitan monostearate polyoxyethylene derivative, the triethanolamine salt of technical lauryl sulfate, the diethylcyclohexylamine salt of technical lauryl sulfate, the sodium salt of technical lauryl sulfate and an alkyl aryl polyether alcohol. None of the resulting compositions gives a satisfactory stable aqueous emulsion of the N,N'-diphenyl-1,2-propanediamine. In each case the composition is either non-homogeneous or disperses poorly in water at 60 to 80° C.

*Example 6*

A series of anti-fume compositions is prepared from 31 parts of N,N'-diphenyl-1,2-propanediamine, 17 parts of a water-dispersible, oil-soluble sodium petroleum sulfonate, 41 parts of an organic solvent having an aniline point of about 36° C., 2 parts of water and 9 parts of one of the following compounds: technical triethanolamine, diethylene glycol, propylene glycol, morpholine, technical oleyl alcohol, technical lauryl alcohol, methyl alcohol, 95% ethyl alcohol, isopropyl alcohol, butyl alcohol, isoamyl alcohol, dibutylamine, methyl ethyl ketone, anisole, dimethylformamide, oleic acid, potassium rosinate, 1-amino-2-methyl-2-propanol, cyclohexanol, Cellosolve, hexylene glycol and butyl Carbitol. The compositions containing oleic acid, sodium rosinate, morpholine and dimethylformamide are heterogeneous and therefore unsuitable. The remaining solutions are tested for dispersibility in hot water. The one containing technical triethanolamine is outstanding in the stability of the emulsions formed. Of the remainder, those containing butyl Carbitol and 1-amino-2-methyl-2-propanol are better than the others but definitely poorer than the sample containing technical triethanolamine.

*Example 7*

Solutions are prepared containing the ingredients shown in the following table. The results illustrate the effect of variation in the concentration of the sodium petroleum sulfonate.

| | 1 | 2 | 3 | 4 | 5 | 6 | 7 |
|---|---|---|---|---|---|---|---|
| Sodium petroleum sulfonate | 24 | 18 | 15 | 16 | 12 | 9.5 | 8.5 |
| N,N'-diphenyl-1,2-propanediamine | 29 | 30 | 36 | 30 | 33 | 33 | 33 |
| Triethanolamine | 7 | 8 | 8 | 7 | 5 | 5 | 5 |
| Organic solvent | 38 | 42 | 39 | 45.5 | 48.5 | 51 | 52.5 |
| Water | 2 | 2 | 2 | 1.5 | 1.5 | 1.5 | 1.0 |
| Aniline point of solvent, °C | 38 | 45 | 42 | 16 | 5 | 15 | 11 |
| Clarity at 25° C | OK | OK | OK | OK | OK | OK | Cloudy |
| Clarity at 10° C | OK | OK | OK | OK | OK | OK | Do. |
| Dilute emulsion stability, 60° C | Fair | Exc | Good | Good | Good | Good | Poor |
| Concentrated emulsion stability at 60° C | Good | Exc | Good | Exc | Exc | Exc | Do. |

*Example 8*

Compositions are compared containing from 9.5 to 18.5% of sodium petroleum sulfonate, from 29 to 38% of N,N'-diphenyl-1,2-propanediamine, from 37 to 43% of organic solvent mixtures having aniline poinnts between 15 to 49, from 1.5 to 2.0% water and the amounts of triethanolamine shown in the following table.

| Percent Triethanolamine | Clarity | | Emulsion Stability at 60° C. | |
|---|---|---|---|---|
| | 25° C. | 10° C. | dilute | con. |
| 0 | Cloudy | Cloudy | Poor | Poor. |
| 2 | do | do | do | Fair. |
| 4 | OK | do | Fair | Do. |
| 5 | OK | do | do | Good. |
| 6 | OK | OK | Good | Do. |
| 8 | OK | OK | Exc. | Do. |
| 10 | OK | OK | Good | Do. |
| 11 | OK | Cloudy | do | Do. |
| 12 | Cloudy | do | Fair | Do. |

In compositions containing low concentrations of sodium petroleum sulfonate and high concentrations of organic solvents with low aniline points, less than the defined amount of triethanolamine is required to maintain homogeneity at low temperatures. Poor aqueous emulsions are obtained, however, unless adequate amounts of triethanolamine are used, as shown by the following compositions. In each case the aniline point of the solvent mixture is below 45° C.

| | 1 | 2 | 3 | 4 | 5 | 6 |
|---|---|---|---|---|---|---|
| Sodium petroleum sulfonate | 7.2 | 7.2 | 12 | 12 | 12 | 12. |
| N,N'-diphenyl-1,2-propanediamine | 33 | 33 | 34 | 34 | 34 | 33. |
| Triethanolamine | 0 | 2 | 0 | 2 | 4 | 5. |
| Organic solvent | 59 | 57 | 48.5 | 50.5 | 52.5 | 48.5. |
| Water | 1.0 | 1.0 | 1.5 | 1.5 | 1.5 | 1.5. |
| Clarity at 25° C | Cloudy | OK | OK | OK | OK | OK. |
| Clarity at 10° C | do | OK | OK | OK | OK | OK. |
| Dilute emulsion stability, 60° C. | Poor | V. Poor | V. Poor | V. Poor | V. Poor | Good. |

The compositions of this invention are used simply by pouring the desired amount into the dye-bath. This can be done either before or during application of the dye to the fabric. The ready dispersibility of the compositions permits their use under a wide variety of operating conditions without danger of non-uniformity in the resulting emulsions or in the dyed fabric. They may be stored for extended periods even at winter warehouse temperatures without deterioration. In addition they possess low toxicity, an acceptable odor, a relatively high flash point and moderate cost. Although particularly useful in connection with the dyeing of cellulose acetate, they are applicable with any fabric which is to be dyed with materials subject to fume-fading.

I claim:
1. An anti-fume composition consisting of from 28 to 38% by weight of N,N'-diphenyl-1,2-propanediamine, from 9 to 25% by weight of an oil-soluble, water-dispersible sodium petroleum sulfonate, from 5 to 11% by weight of triethanolamine, from 35 to 50% by weight of a water-immiscible organic solvent mixture having an aniline point of less than 50° C., and containing a mineral oil and a cyclic hydrocarbon solvent from the class consisting of aromatic, naphthenic and terpene hydrocarbons, and from 0 to 2% by weight of water.

2. A composition according to claim 1 in which the organic solvent mixture consists of from 60 to 70% by weight of a high-flash aromatic hydrocarbon solvent and from 30 to 40% by the weight of mineral oil.

3. An anti-fume composition consisting of from 31 to 35% by weight of N,N'-diphenyl-1,2-propanediamine, from 14.0 to 16.0% by weight of an oil-soluble, water-dispersible sodium petroleum sulfonate, from 7.0 to 9.5% by weight of triethanolamine, from 12.5 to 15.0% by weight of mineral oil, from 25 to 29% by weight of a high-flash aromatic coal-tar solvent, the aniline point of the mixture of mineral oil and aromatic solvent being less than 50° C., and from 0 to 2.0% by weight of water.

References Cited in the file of this patent
UNITED STATES PATENTS

| Number | Name | Date |
|---|---|---|
| 2,409,257 | Croft | Oct. 15, 1946 |
| 2,546,168 | Hart | Mar. 27, 1951 |

FOREIGN PATENTS

| Number | Country | Date |
|---|---|---|
| 307,948 | Great Britain | Mar. 14, 1929 |
| 354,326 | Great Britain | Aug. 4, 1931 |